(12) United States Patent
Choi et al.

(10) Patent No.: US 12,145,613 B2
(45) Date of Patent: Nov. 19, 2024

(54) APPARATUS AND METHOD FOR PROVIDING AUTONOMOUS DRIVING INFORMATION

(71) Applicants: Hyundai Motor Company, Seoul (KR); Kia Corporation, Seoul (KR)

(72) Inventors: Eun Young Choi, Seoul (KR); Jin Su Jeong, Suwon-si (KR); Woo Jin Kim, Incheon (KR); Seo Hyung Cheon, Seongnam-si (KR); Rosali Sun Pyun, Seongnam-si (KR); Ki Seok Seong, Cheonam-si (KR); Dong Il Yang, Seoul (KR); Min Sang Yu, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 428 days.

(21) Appl. No.: 17/515,799

(22) Filed: Nov. 1, 2021

(65) Prior Publication Data

US 2022/0258756 A1 Aug. 18, 2022

(30) Foreign Application Priority Data

Feb. 16, 2021 (KR) .......................... 10-2021-0020640

(51) Int. Cl.
*B60W 50/00* (2006.01)
*B60K 35/00* (2006.01)
(Continued)

(52) U.S. Cl.
CPC .............. *B60W 50/14* (2013.01); *B60K 35/00* (2013.01); *B60W 60/0053* (2020.02);
(Continued)

(58) Field of Classification Search
CPC ............ B60W 50/14; B60W 60/0053; B60W 2050/146; B60W 2420/403; B60W 2540/225; B60W 2540/229; B60W 2552/53; B60W 2554/801; B60W 2554/802; B60W 30/18163; B60W 60/0057; B60W 2540/215;
(Continued)

(56) References Cited

U.S. PATENT DOCUMENTS

2006/0119474 A1* 6/2006 Requejo .................. B60Q 9/00
340/438
2009/0157247 A1* 6/2009 Sjogren .................... B62D 1/28
701/41

(Continued)

*Primary Examiner* — Shardul D Patel
(74) *Attorney, Agent, or Firm* — Morgan, Lewis & Bockius LLP

(57) ABSTRACT

In an apparatus and a method for providing information on autonomous driving of a vehicle to a passenger of the vehicle, when it is recognized whether partial autonomous driving of a vehicle is activated, information on whether a user operates a device including a display may be acquired, and it is determined the user operates the display in a state in which the partial autonomous driving is activated, information on the autonomous driving of the vehicle may be output through the display. An effect of inducing an alert measure of the driver against a dangerous situation may be provided by providing driving information at a site, at which a sight of the driver stays.

20 Claims, 13 Drawing Sheets

| Automation level | SAE classification reference | Roles of system | Roles of driver |
|---|---|---|---|
| LEVEL 0 | No automation | Temporary emergent intervention or provision of warning | Perform all driving functions by driver |
| LEVEL 1 | Driver Assistance | Perform some driving functions such as steering and acceleration/deceleration together while driver who performs driving function in normal operation section is on board | Determine operation/timing of level 1 system and perform all operations except for manipulation of handle or acceleration/deceleration pedal (including monitoring of driving environment/driving of vehicle/level 1 system and instantaneous measure for emergent situation) |
| LEVEL 2 | Partial autonomous driving | Perform driving functions such as steering and acceleration/deceleration instead of driver while driver who monitors steering and acceleration/deceleration devices | Determine operation/timing of system and perform all operations except for manipulation of handle or acceleration/deceleration pedal (including monitoring of driving environment/driving of vehicle/level 2 system and instantaneous measure for emergent situation) |
| LEVEL 3 | Conditional autonomous driving | Transfer driving control right to driver in situations other than condition, and perform driving functions such as steering and acceleration/deceleration | Determine operation/timing of system and perform all operations except for manipulation of handle or acceleration/deceleration pedal (including monitoring of driving environment/driving of vehicle/level 2 system and instantaneous measure for emergent situation) |
| LEVEL 4 | High autonomous driving | Perform all driving functions while driver is on board, except for extremely exceptional situation | May selectively perform measure for emergency situation when transfer of control right of level 4 system is requested |
| LEVEL 5 | Full autonomous driving | Perform all driving functions which system may cope with without any driver | Determine only whether system is to be operated and do not perform all driving operations |

(51) Int. Cl.
  *B60W 50/14* (2020.01)
  *B60W 60/00* (2020.01)
  *B60K 35/28* (2024.01)
  *B60K 35/65* (2024.01)
(52) U.S. Cl.
  CPC .............. *B60K 35/28* (2024.01); *B60K 35/65* (2024.01); *B60K 2360/166* (2024.01); *B60K 2360/175* (2024.01); *B60K 2360/178* (2024.01); *B60K 2360/179* (2024.01); *B60K 2360/741* (2024.01); *B60W 2050/146* (2013.01); *B60W 2420/403* (2013.01); *B60W 2540/225* (2020.02); *B60W 2540/229* (2020.02); *B60W 2552/53* (2020.02); *B60W 2554/801* (2020.02); *B60W 2554/802* (2020.02)
(58) Field of Classification Search
  CPC .......... B60W 60/0055; B60W 60/001; B60W 2556/45; B60W 50/00; B60K 35/00; B60K 35/28; B60K 35/65; B60K 2360/166; B60K 2360/175; B60K 2360/178; B60K 2360/179; B60K 2360/741; B60K 35/80; B60K 2360/21; B60K 2360/566; B60K 35/22; G05D 1/0061; G05D 1/0088; G06V 20/588; B60Y 2300/18166
  USPC ........................................................ 701/23
  See application file for complete search history.

(56) References Cited

U.S. PATENT DOCUMENTS

| | | | |
|---|---|---|---|
| 2012/0173069 A1* | 7/2012 | Tsimhoni | B60W 30/18163 701/25 |
| 2015/0094899 A1* | 4/2015 | Hackenberg | B60W 60/0059 701/23 |
| 2015/0191176 A1* | 7/2015 | Kobana | B60W 50/12 701/70 |
| 2015/0266486 A1* | 9/2015 | Silvlin | B60W 50/10 701/70 |
| 2018/0075309 A1* | 3/2018 | Sathyanarayana | G06N 7/01 |
| 2022/0032963 A1* | 2/2022 | Gäng | B60W 30/165 |
| 2022/0204035 A1* | 6/2022 | MacKenzie | B60W 40/107 |

* cited by examiner

| Automation level | SAE classification reference | Roles of system | Roles of driver |
|---|---|---|---|
| LEVEL 0 | No automation | Temporary emergent intervention or provision of warning | Perform all driving functions by driver |
| LEVEL 1 | Driver Assistance | Perform some driving functions such as steering and acceleration/deceleration together while driver who performs driving function in normal operation section is on board | Determine operation/timing of level 1 system and perform all operations except for manipulation of handle or acceleration/deceleration pedal (including monitoring of driving environment/driving of vehicle/level 1 system and instantaneous measure for emergent situation) |
| LEVEL 2 | Partial autonomous driving | Perform driving functions such as steering and acceleration/deceleration instead of driver while driver who monitors steering and acceleration/deceleration devices | Determine operation/timing of system and perform all operations except for manipulation of handle or acceleration/deceleration pedal (including monitoring of driving environment/driving of vehicle/level 2 system and instantaneous measure for emergent situation) |
| LEVEL 3 | Conditional autonomous driving | Transfer driving control right to driver in situations other than condition, and perform driving functions such as steering and acceleration/deceleration | Determine operation/timing of system and perform all operations except for manipulation of handle or acceleration/deceleration pedal (including monitoring of driving environment/driving of vehicle/level 2 system and instantaneous measure for emergent situation) |
| LEVEL 4 | High autonomous driving | Perform all driving functions while driver is on board, except for extremely exceptional situation | May selectively perform measure for emergency situation when transfer of control right of level 4 system is requested |
| LEVEL 5 | Full autonomous driving | Perform all driving functions which system may cope with without any driver | Determine only whether system is to be operated and do not perform all driving operations |

FIG.1

APPARATUS AND METHOD FOR PROVIDING AUTONOMOUS DRIVING INFORMATION

CROSS-REFERENCE TO RELATED APPLICATION

The present application claims priority to Korean Patent Application No. 10-2021-0020640, filed on Feb. 16, 2021, the entire contents of which is incorporated herein for all purposes by this reference.

BACKGROUND OF THE INVENTION

Field of the Invention

The present invention relates to an apparatus and a method for providing autonomous driving information, and more particularly, to an apparatus and a method for providing information on autonomous driving of a vehicle to a passenger of the vehicle.

Description of Related Art

An autonomous driving vehicle requires an ability to adaptively cope with a surrounding situation that changes in real time while driving of the vehicle. In order to mass-produce and activate autonomous driving vehicles, a determination control function which is reliable is required first. Autonomous driving vehicles that have been released recently have decreased fatigues of the drivers by basically performing driving, braking, and steering of the vehicles instead of the drivers. The recent autonomous driving vehicles have been sold while being provided with a highway driving assist (HDA) function, a driver status warning (DSW) function of determining an carelessness of a driver, such as dozing off at the wheel, deviation of sights, and the like, and a state disorder of the vehicle to output a warning alarm through a cluster and the like, a driver awareness warning (DAW) function of identifying whether the driver performs unstably driving while crossing the lines, through a front camera, and a forward collision-avoidance assisting (FCA) or active emergency brake system (AEBS) function of performing abrupt braking when a front collision is detected.

In particular, in not full autonomous driving but partial autonomous driving, the driver has to intervene in a dangerous situation to receive a control right of the vehicle. It is an important factor in determining a responsibility of an accident to stare at the front side. Accordingly, the accuracy of a driver monitoring system is directly associated with determination of the responsibility of an accident.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for providing information of autonomous driving of a vehicle to a passenger of the vehicle through a display.

Various aspects of the present invention provide an apparatus and a method for providing autonomous driving information, which may effectively provide driving information to a site, at which a sight of a driver stays in an eye off situation.

Various aspects of the present invention provide an apparatus and a method for providing autonomous driving information, which decreases a probability of generation of a dangerous situation by providing information for a driver when a sight of the driver is not toward the front when an autonomous driving level is a level, by which an eye-off is not allowed.

Various aspects of the present invention provide an apparatus and a method for providing autonomous driving information, which decreases a danger of an accident by allowing a driver to acquire a control right promptly when the control right of the driver is necessary.

Various aspects of the present invention provide an apparatus and a method for providing autonomous driving information, which may cope with occurrence of an accident by delivering information with a color or flickering or giving a warning such that a driver intuitively recognizes information on autonomous driving through a display.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, an apparatus of providing autonomous driving information includes an autonomous driving recognizer that recognizes whether partial autonomous driving of a vehicle is activated, a detector that acquires whether a device including a display is operated by a user, and a controller that outputs autonomous driving information of the vehicle through the display when the controller determines that the user operates the display in a state, in which the partial autonomous driving is activated.

In various exemplary embodiments of the present invention, the device including the display may include at least one of a communication terminal and an audio video navigation (AVN) system.

In various exemplary embodiments of the present invention, the detector may acquire information on whether the user operates the device including the display, according to an image acquired through at least one of a camera provided in an interior of the vehicle and a camera provided in a communication terminal of the user.

In various exemplary embodiments of the present invention, the detector may acquire information on whether the user operates a communication terminal of the user, through information associated with the communication terminal.

In various exemplary embodiments of the present invention, the detector may acquire information on whether the user operates an AVN system, based on whether the user executes a function which is not related to driving of the vehicle through the AVN system.

In various exemplary embodiments of the present invention, the autonomous driving information of the vehicle may include information on a distance between vehicles, information on recognition of lines, information on a time left until generation of a transition demand (TD), and information on whether a lane change is possible.

In various exemplary embodiments of the present invention, the controller may output a warning through the display when the controller determines that an autonomous driving level of the vehicle is a level, at which the user is not allowed to take his or her eyes off from a front side of the vehicle.

In various exemplary embodiments of the present invention, the controller may cover a screen of the display by stages according to the time left until the generation of the TD when the controller determines that there is no response of the user to the generation of the TD.

In various exemplary embodiments of the present invention, the controller may output a front image of the vehicle through the display when the controller determines that an intervention is necessary according to a predetermined reference based on the time left until the generation of the TD.

In various exemplary embodiments of the present invention, the controller may output autonomous driving information through at least one of a color and flickering of the display, and vibration of the device including the display.

In various exemplary embodiments of the present invention, the controller may output a rear image in a direction, in which a lane is changed, through the display when a command for a lane change through the autonomous driving is input to the device by the user.

In various exemplary embodiments of the present invention, the controller may output information on at least one of whether opposite lines of the vehicle are recognized and whether a lane of the vehicle is changeable to opposite sides of the vehicle, through at least one of a color and flickering displayed at a portion or an entire portion of an edge portion of the display.

According to various aspects of the present invention, a method for providing autonomous driving information includes recognizing, by an autonomous driving recognizer, whether partial autonomous driving of a vehicle is activated, acquiring, by a detector, information on whether a user operates a device including a display, and outputting, by a controller, autonomous driving information of the vehicle through the display when the controller determines that the user operates the display in a state, in which the partial autonomous driving is activated.

In various exemplary embodiments of the present invention, the device including the display may include at least one of a communication terminal and an AVN system.

In various exemplary embodiments of the present invention, the autonomous driving information of the vehicle may include information on a distance between vehicles, information on recognition of a line, information on a time left until generation of a TD, and information on whether a lane change is possible.

In various exemplary embodiments of the present invention, the outputting, by the controller, of autonomous driving information of the vehicle through the display when the controller determines that the user operates the display in a state, in which the partial autonomous driving is activated may include outputting, by the controller, a warning through the display when the controller determines that an autonomous driving level of the vehicle is a level, at which the user is not allowed to take his or her eyes off from a front side.

In various exemplary embodiments of the present invention, the outputting, by the controller, of autonomous driving information of the vehicle through the display when the controller determines that the user operates the display in a state, in which the partial autonomous driving is activated may include covering, by the controller, a screen of the display by stages according to the time left until the generation of the TD when the controller determines that there is no response of the user to the generation of the TD.

In various exemplary embodiments of the present invention, the outputting, by the controller, of autonomous driving information of the vehicle through the display when the controller determines that the user operates the display in a state, in which the partial autonomous driving is activated may include outputting, by the controller, a front image of the vehicle through the display when the controller determines that an intervention is necessary according to a predetermined reference based on the time left until the generation of the TD.

In various exemplary embodiments of the present invention, the outputting, by the controller, of autonomous driving information of the vehicle through the display when the controller determines that the user operates the display in a state, in which the partial autonomous driving is activated may include outputting, by the controller, a rear image in a direction, in which a lane is changed, through the display when a command for a lane change through the autonomous driving is input to the device by the user.

In various exemplary embodiments of the present invention, the outputting, by the controller, of autonomous driving information of the vehicle through the display when the controller determines that the user operates the display in a state, in which the partial autonomous driving is activated may include outputting, by the controller, information on at least one of whether opposite lines of the vehicle are recognized and whether a lane of the vehicle is changeable to opposite sides of the vehicle, through at least one of a color and flickering displayed at a portion or an entire portion of an edge portion of the display.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a table, in which automation levels of an autonomous driving vehicle are defined;

Figure 2:
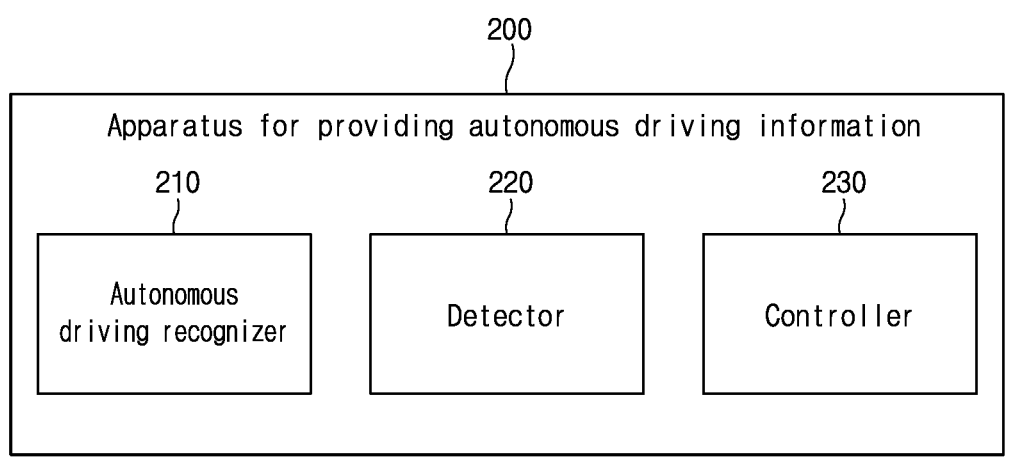
FIG. 2 is a block diagram illustrating an apparatus of providing autonomous driving information according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of the related known configuration or function will be omitted when it is determined that it interferes with the understanding of the exemplary embodiment of the present invention.

In describing the components of the exemplary embodiment according to various exemplary embodiments of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Hereinafter, embodiments of the present invention will be described in detail with reference to FIGS. 1 to 13.

FIG. 1 is a table, in which automation levels of an autonomous driving vehicle are defined.

An autonomous driving vehicle refers to a vehicle that travels by itself while determining a danger by recognizing a driving environment by itself, and minimizing a driving operation by a driver while controlling a driving path.

Ultimately, an autonomous driving vehicle refers to a vehicle which may be driven, manipulated, and parked without any influence of a person, and focuses on a vehicle in a state, in which an autonomous driving technology which is a core basis of the autonomous driving vehicle, that is, an ability of driving a vehicle without active control or monitoring by a driver is maximally developed.

However, the concept of a current autonomous driving vehicle may include an automation step of a middle step which is developed to an autonomous driving vehicle of a perfect meaning, and corresponds to a goal-oriented concept with a premise of mass-production and commercialization of perfect autonomous driving vehicles.

The method for controlling autonomous driving according to various exemplary embodiments of the present invention may be applied to an autonomous driving vehicle corresponding to level 3 (conditional autonomous driving) of automation steps of the autonomous driving illustrated in FIG. 1, but the present invention is not limited thereto and may be applied to autonomous driving vehicles of all levels that require transfer of control rights and control of the vehicles as the systems break down during autonomous driving.

The automation levels of autonomous driving vehicles with reference to Society of Automotive Engineers (SAE) which is a vehicle technician association of the U.S.

FIG. 2 is a block diagram illustrating an apparatus of providing autonomous driving information according to various exemplary embodiments of the present invention.

Referring to FIG. 2, an apparatus 200 for providing autonomous driving information may include an autonomous driving recognizer 210, a detector 220, and a controller 230.

The apparatus 200 for providing autonomous driving information according to various exemplary embodiments of the present invention may be implemented inside or outside a vehicle. Accordingly, the apparatus 200 for providing autonomous driving information may be integrally formed with control units in the interior of the vehicle, and may be implemented as a separate apparatus to be connected to the control units of the vehicle by a separate connection unit.

As an example, the apparatus 200 for providing autonomous driving information may be integrally implemented with a vehicle, may be implemented to be provided in or attached to the vehicle as a separate configuration from the vehicle, and a portion of the apparatus 200 may be integrally implemented and the other portions of the apparatus 200 may be provided in or attached to the vehicle as separate configurations.

The autonomous driving recognizer 210 may recognize whether partial autonomous driving of the vehicle is activated.

The autonomous driving recognizer 210 may be directly or indirectly connected to a user interface (UI) for receiving an autonomous driving mode of the vehicle from an autonomous driving system of the vehicle or a user through wireless or wired communication to transmit and receive information.

As an example, the autonomous driving recognizer 210 may be connected to the autonomous driving system of the vehicle to acquire information on autonomous driving step of the vehicle from the autonomous driving system, and may recognize whether the partial autonomous driving is activated through the acquired autonomous driving step.

As an example, the autonomous driving recognizer 210 may recognize whether the partial autonomous driving of the vehicle is activated, based on an autonomous driving mode input by the user.

As an example, the partial autonomous driving may refer to autonomous driving of levels 2 to 4 of FIG. 1, at which autonomous driving that does not correspond to perfect autonomous driving is performed when the driver is on board.

The detector 220 may acquire information on whether the user operates a device including a display.

As an example, the device including the display may include at least one of a communication terminal and an audio video navigation (AVN) system.

The detector 220 may be directly or indirectly connected to a camera provided in the interior of the vehicle, a camera provided in the communication terminal of the user, the communication terminal of the user, or the AVN system provided in the vehicle, through wireless or wired communication to transmit and receive information.

As an example, the detector 220 may acquire information on whether the user operates the device including the display, based on an image acquired through at least one of the camera provided in the interior of the vehicle and the camera provided in the communication terminal of the user.

In detail, the detector 220 may acquire information on whether the user operates the device including the display, through a camera connected to the autonomous driving system of the vehicle to monitor the user.

As an example, the detector 220 may detect information on a sight of the user through the camera, and may acquire information on whether the user operates the device including the display according to whether the sight of the user faces the device including the display.

As various exemplary embodiments of the present invention, the detector 220 may detect information on a sight of the user through the camera provided in the communication terminal of the user, and may acquire information on whether the user operates the device including the display according to whether the sight of the user faces the device including the display.

As an example, the detector 220 may acquire information on whether the user operates the communication terminal, through information associated with the communication terminal of the user.

As an example, the detector 220 may acquire information on whether the user operates the communication terminal, through information associated with the communication terminal of the user connected to the vehicle through a connected vehicle system.

In detail, the detector 220 may acquire information on whether the user operates the communication terminal through information on whether the communication terminal connected to the vehicle through the connected vehicle system is operated by an external input.

As an example, the detector 220 may acquire information on whether the user operates the AVN system, based on information on whether the user executes a function which is not related to driving of the vehicle through the AVN system.

In detail, the detector 220 may acquire information on whether the user operates the AVN system, based on information on whether the user executes a function, such as web surfing, playback of a video, playback of contents, which is not related to driving of the vehicle, through the AVN system.

As an example, the detector 220 may detect whether the user executes a function which is not related to the driving of the vehicle, based on information on a function selected by the user on a menu displayed in the AVN system.

The controller 230 may perform an overall control such that the elements may normally perform their functions. The controller 230 may be implemented in a form of hardware, may be implemented in a form of software, or may be implemented in a form of a combination of hardware and software. The controller 230 may be implemented by a microprocessor, but the present invention is not limited thereto. Furthermore, the controller 230 may perform various data processing and calculations, which will be described below.

The controller 230 may output autonomous driving information of the vehicle, through the display, when it is determined that the user operates the display in a state, in which the partial autonomous driving is activated.

The controller 230 may induce an alert response of the user in a dangerous situation by outputting autonomous driving related information on the display, which the sight of the user faces.

For example, the controller 230 may output the autonomous driving related information at a specific portion of the display of the communication terminal when it is determined that the user operates the communication terminal, and may output the autonomous driving related information at a specific portion of the display of the AVN system when it is determined that the user operates the AVN system.

As an example, the controller 230 may output the autonomous driving related information in an edge portion space of the screen to provide the autonomous driving related information while continuously outputting an image output on the display and the like.

As an example, the autonomous driving information of the vehicle may include information on a distance between vehicles, information on recognition of a line, information on a time left until generation of a transition demand (TD), and information on whether a lane change is possible.

As an example, the autonomous driving information may include a left time, by which the user is allowed to take his or her hands off from a handle, when the user is allowed to take his or her hands off from the handle.

As an example, the controller 230 may be directly or indirectly connected to the autonomous driving system through wireless or wired communication to receive the autonomous driving related information and output the received autonomous driving related information through the display.

As an example, the controller 230 may output autonomous driving information through at least one of a color and flickering of the display, and vibration of the device including the display.

As an example, the controller 230 may output information on at least one of whether opposite lines of the vehicle are recognized and whether a lane of the vehicle is changeable to opposite sides of the vehicle, through at least one of a color and flickering displayed at a portion or an entire portion of an edge portion of the display.

Furthermore, the controller 230 may output the autonomous driving information of the vehicle through a number or a letter displayed on the display.

An aspect of outputting, by the controller 230, the autonomous driving information through the display will be described in detail with reference to FIGS. 3 to 12.

Figure 3:
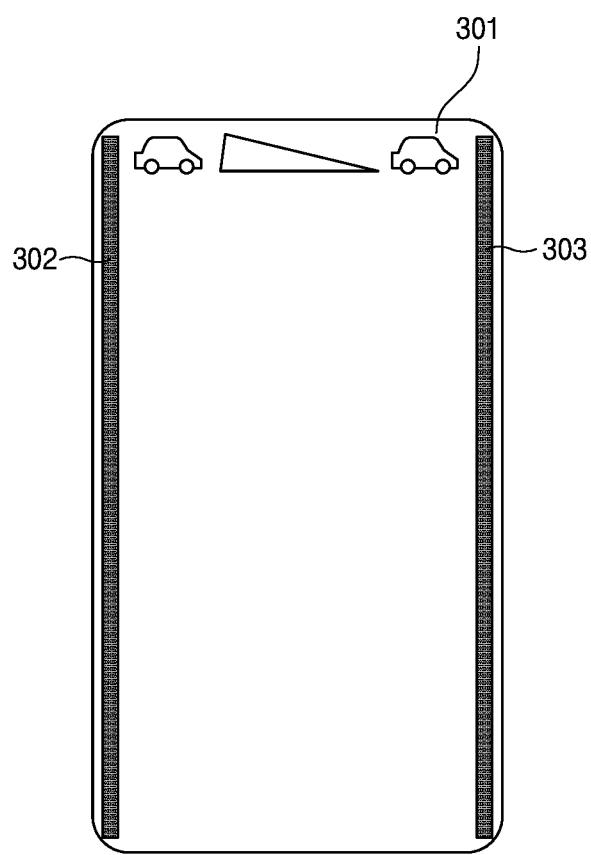
FIG. 3 is a view exemplarily illustrating a display that outputs autonomous driving information according to various exemplary embodiments of the present invention.

FIG. 3 is a view exemplarily illustrating a display that outputs autonomous driving information according to various exemplary embodiments of the present invention.

Referring to FIG. 3, the apparatus 200 for providing autonomous driving information may output autonomous driving information of a vehicle through lines 302 and 303 displayed at edge portions of left and right side surfaces of a display of a communication terminal when it is determined that the user operates the communication terminal.

Furthermore, the apparatus 200 for providing autonomous driving information may output autonomous driving information of the vehicle through a graphic 301 displayed on an upper edge portion of the display of the communication terminal.

As an example, the apparatus 200 for providing autonomous driving information may output at least one of information on recognition of lines and information on whether a lane change is possible, through the lines 302 and 303 displayed on the edge portions of the left and right side surfaces of the display of the communication terminal, and may output information on a distance between vehicles, through the graphic 301 displayed at the upper edge portion of the display of the communication terminal.

The graphic 301 displayed at the upper edge portion of the display will be described in detail through FIG. 5.

The apparatus 200 for providing autonomous driving information may output at least one of information on recognition of a left line of the vehicle and information on whether a lane change to the left side is possible, through the line 302 displayed at the left edge portion of the display of the communication terminal, and may output at least one of information on recognition of a right line of the vehicle and information on whether a lane change to the right side is possible, through the line 303 displayed at the right edge portion of the display of the communication terminal.

Through this, the apparatus 200 for providing autonomous driving information may intuitively deliver the information on the opposite lines to the user, and the user may recognize the information on the opposite lines promptly even though the user does not concentrate his or her attention on an edge portion of the display of the communication terminal.

Figure 4:
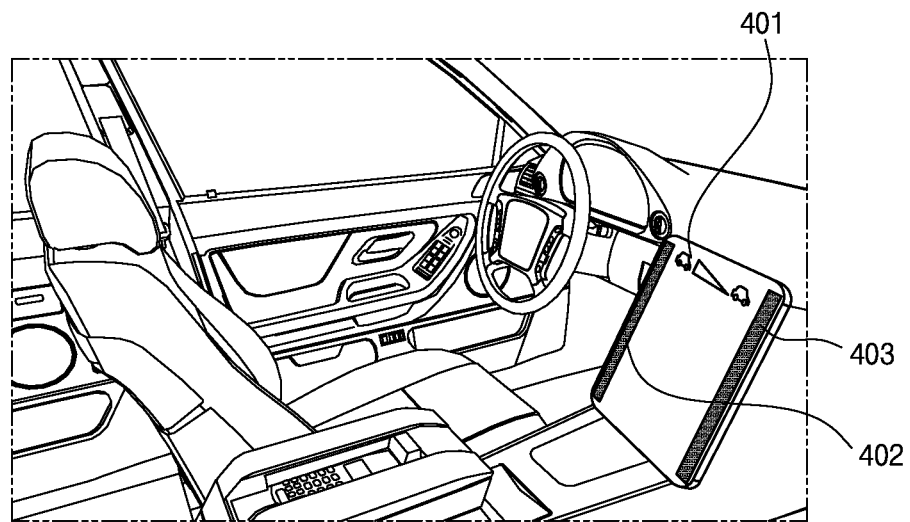
FIG. 4 is a view exemplarily illustrating an AVN system that outputs autonomous driving information according to various exemplary embodiments of the present invention.

FIG. 4 is a view exemplarily illustrating an AVN system that outputs autonomous driving information according to various exemplary embodiments of the present invention.

Referring to FIG. 4, the AVN system may be provided on a front side of the vehicle.

The apparatus 200 for providing autonomous driving information may output autonomous driving information of the vehicle, through the display of the AVN system when it is determined that the user operates the AVN system.

The apparatus 200 for providing autonomous driving information may output the autonomous driving information of the vehicle through lines 402 and 403 displayed on left and right edge portions of the display of the AVN system.

Furthermore, the apparatus 200 for providing autonomous driving information may output autonomous driving information of the vehicle through a graph 401 displayed on an upper edge portion of the display of the AVN system.

As an example, the apparatus 200 for providing autonomous driving information may output at least one of information on recognition of lines and information on whether a lane change is possible, through the lines 402 and 403 displayed on the edge portions of the left and right side surfaces of the display of the AVN system, and may output information on a distance between vehicles, through the graph 401 displayed at the upper edge portion of the display of the AVN system.

The graphic 401 displayed at the upper edge portion of the display will be described in detail through FIG. 5.

The apparatus 200 for providing autonomous driving information may output at least one of information on recognition of a left line of the vehicle and information on whether a lane change to the left side is possible, through the line 402 displayed at the left edge portion of the display of the AVN system, and may output at least one of information on recognition of a right line of the vehicle and information on whether a lane change to the right side is possible, through the line 403 displayed at the right edge portion of the display of the AVN system.

Through this, the apparatus 200 for providing autonomous driving information may intuitively deliver the information on the opposite lines to the user, and the user may recognize the information on the opposite lines promptly even though the user does not concentrate his or her attention on an edge portion of the display of the AVN system.

Figure 5:
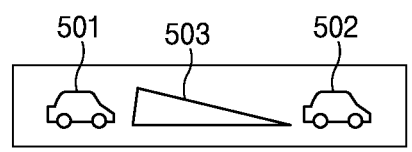
FIG. 5 is a view exemplarily illustrating information on a distance between vehicles, which is output on a display according to various exemplary embodiments of the present invention.

FIG. 5 is a view exemplarily illustrating information on a distance between vehicles, which is output on a display according to various exemplary embodiments of the present invention.

Referring to FIG. 5, the apparatus 200 for providing autonomous driving information may output information on distances from surrounding vehicles, through a graphic displayed on a display.

For example, the distances may be information acquired through sensors, such as a radar, a Light Detection and Ranging (LiDAR), a camera, and the like.

As an example, the graphics that represent information on the distances may include two FIGS. 501 and 502 having a shape of a vehicle, and a FIG. 503, on which the distances are displayed.

As an example, the apparatus 200 for providing autonomous driving information may display the distances according to a degree, by which the FIG. 503 that represents the distances, is filled.

As an example, the apparatus 200 for providing autonomous driving information may display the FIG. 503 that displays the distance from a front vehicle on the display in a state in which an interior of the FIG. 503 is filled to a large amount when the distance from a front vehicle is far, and may display the FIG. 503 that displays the distance from the front vehicle on the display in a state in which the interior of the FIG. 503 is filled to a small amount when the distance from a front vehicle is close.

Furthermore, the apparatus 200 for providing autonomous driving information may classify a succeeding vehicle 501 and a preceding vehicle 502, in which the user is on board, according to a disposition of the two figures having the shape of the vehicle and output them on the display, and may display the FIG. 503 on the display such that only a portion, which is close to the preceding vehicle 502, of an interior of the FIG. 503 that displays the distances from the vehicles is filled as the distances become closer.

As an example, the apparatus 200 for providing autonomous driving information may display that the distances from the vehicles decreases, through graphics, when the distances decrease, and may deliver information on the decrease of the distances to the user by outputting vibration of the device including the display.

The apparatus 200 for providing autonomous driving information may display information on the distances from the vehicles, through the display, as described above, but this is simply one of embodiments and the present invention is not limited thereto and may display information in the distances from the vehicles in different schemes.

Through FIGS. 6 to 12, it will be described that the apparatus 200 for providing autonomous driving information outputs the autonomous driving information through the display in a specific situation. The specific situation assumed in FIGS. 6 to 12 may be a situation of level 3, at which the user is allowed to take his or her eyes off from the front side thereof.

Figure 6:
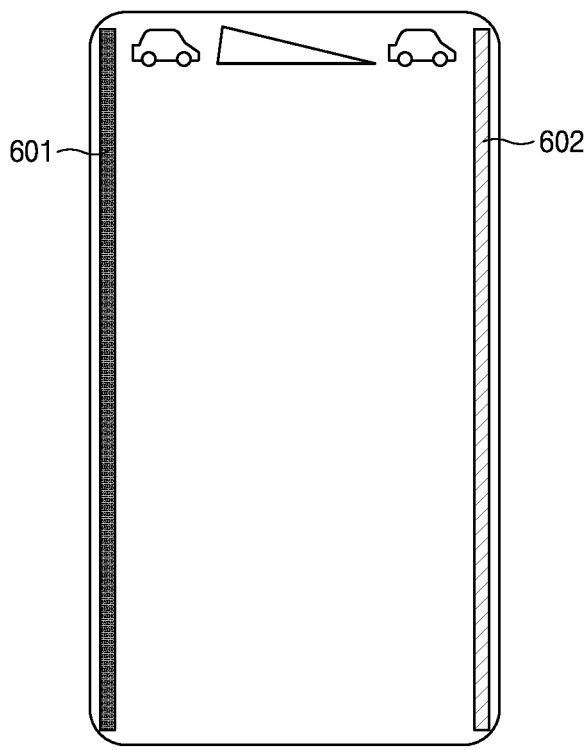
FIG. 6 is a view exemplarily illustrating a display that outputs information on recognition of lines according to various exemplary embodiments of the present invention.

FIG. 6 is a view exemplarily illustrating a display that outputs information on recognition of lines according to various exemplary embodiments of the present invention.

Referring to FIG. 6, the apparatus 200 for providing autonomous driving information may output information on recognition of lines through a line 601 displayed at a left edge portion of the display and a line 602 displayed at a right edge portion of the display.

When there is no line on a road or the paint of the line is faint, a line may not be recognized, and the situation may be recognized through the camera included in the autonomous driving system provided in the vehicle.

The display illustrated in FIG. 6 may represent a situation, in which a right line is not recognized.

The apparatus 200 for providing autonomous driving information may display both of the line 601 displayed at the left edge portion of the display and the line 602 displayed at the right edge portion of the display in a first color, when both the lines are recognized.

For example, the first color may be a green color.

The apparatus 200 for providing autonomous driving information may display the line 601 displayed at the left edge portion of the display in the first color as it is, and may display the line 602 displayed at the right edge portion of the display in a second color when the left line is recognized and the right line is not recognized.

For example, the second color may be a red color or a white color.

As an example, the apparatus 200 for providing autonomous driving information may change and display a color of at least one of the line 601 displayed at the left edge portion of the display and the line 602 displayed at the right edge portion of the display, and may output vibration of the device including the display to deliver the information on recognition of the lines to the user when at least one of the two lines is not recognized.

Although not illustrated, the apparatus 200 for providing autonomous driving information may display the line 602 displayed at the right edge portion of the display in the first color and display the line 602 displayed at the left edge portion of the display in the second color when the right line is recognized and the left line is not recognized, and may display both of the line 601 displayed at the left edge portion of the display and the line 602 displayed at the right edge portion of the display in the second color when neither of the two lines is recognized.

Figure 7:
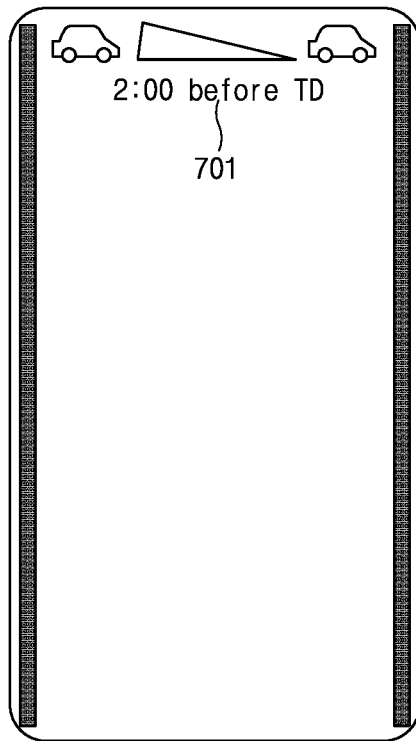
FIG. 7 is a view exemplarily illustrating a display that outputs a time left until generation of a transition demand (TD) according to various exemplary embodiments of the present invention.

FIG. 7 is a view exemplarily illustrating a display that outputs a time left until generation of a TD according to various exemplary embodiments of the present invention.

Referring to FIG. 7, the apparatus 200 for providing autonomous driving information may output information on time left until generation of a TD, through a letter and a number 701 displayed at an upper portion of the display.

The TD situation refers to a situation, in which autonomous driving cannot be further maintained, and may include situations, such as cutting-in of another vehicle, appearance of a front pedestrian or a wild animal, detection of a front obstacle, abrupt stop of a front vehicle, worsening of the weather, but the present invention is not limited thereto, and may include a system disorder/breakdown situation, such as breakdown of a vehicle controller, a disorder of communication of a vehicle, or lack of a fuel.

As an example, when the vehicle is about to enter a tollgate on the front side during autonomous driving, the apparatus 200 for providing autonomous driving information may output information on a time left until the vehicle enters the tollgate, which is determined in consideration of the speed of the vehicle and a distance to the tollgate.

Through this, even when the user operates the device including the display, a request for transfer of a control right after a time displayed on the display may be recognized, and thus the control right may be efficiently transferred.

Figure 8:
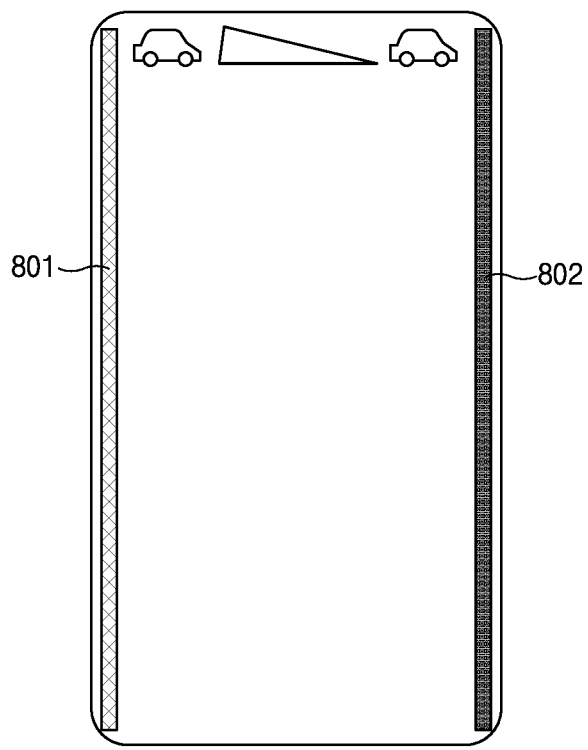
FIG. 8 is a view exemplarily illustrating a display that outputs information on according to whether a lane change is possible according to various exemplary embodiments of the present invention.

FIG. 8 is a view exemplarily illustrating a display that outputs information on according to whether a lane change is possible according to various exemplary embodiments of the present invention.

Referring to FIG. 8, the apparatus 200 for providing autonomous driving information may output information on whether a lane change is possible through a line 801 displayed at a left edge portion of the display and a line 802 displayed at a right edge portion of the display.

The display illustrated in FIG. 8 may represent a situation, in which a lane change to the left side is possible.

The apparatus 200 for providing autonomous driving information may display the line 801 displayed at the left edge portion of the display in a third color and the line 802 displayed at the right edge portion of the display in the first color when a lane change to the left side is possible.

As an example, the third color may be determined to be a color which is different from the second color that displays that a line is not recognized as in FIG. 6.

For example, the third color may be a blue color.

Although not illustrated, the apparatus 200 for providing autonomous driving information may display the line 802 displayed at the right edge portion of the display in the third color and display the line 801 displayed at the left edge portion of the display in the first color when a lane change to the right side is possible and a lane change to the left side is not possible, and may display both of the line 801 displayed at the left edge portion of the display and the line 802 displayed at the right edge portion of the display in the third color when a lane change to both sides is possible.

A case, in which a command for a lane change is input by the user in the present situation, will be described in FIG. 9.

Figure 9:
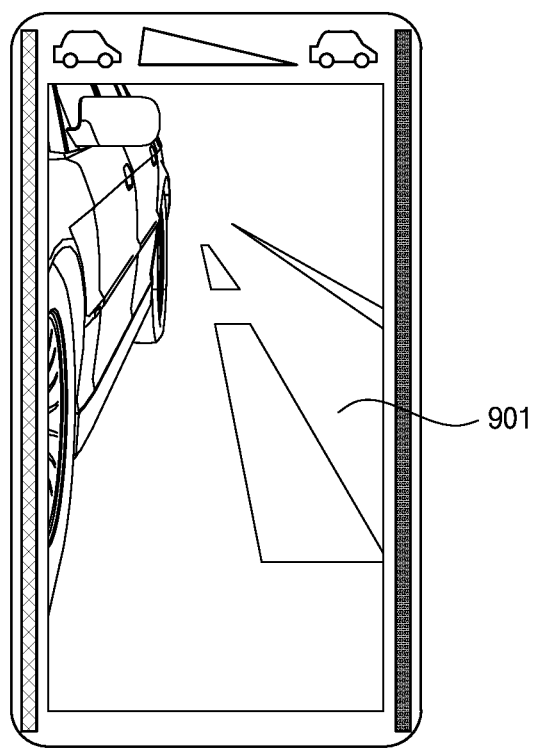
FIG. 9 is a view exemplarily illustrating a display that outputs a rear image in a direction, in which a lane is changed, according to various exemplary embodiments of the present invention.

FIG. 9 is a view exemplarily illustrating a display that outputs a rear image in a direction, in which a lane is changed, according to various exemplary embodiments of the present invention.

Referring to FIG. 9, the apparatus 200 for providing autonomous driving information may output a rear image 901 in a direction, in which a lane is changed, through the display, when a command for a lane change through autonomous driving is input by the user.

As an example, the rear image 901 in the direction, in which the lane is changed, may be an image acquired through the camera provided in the vehicle.

Referring to FIG. 9, the apparatus 200 for providing autonomous driving information may output the rear image 901 in a direction, in which a lane is to be changed, at a center portion of the display while changing the lane, when a command for a lane change through autonomous driving is input by the user.

Through this, the user may take a measure after the control right is transferred promptly while making an attention to the lane change, through a side rear image, even in a partial autonomous driving situation.

Furthermore, the apparatus 200 for providing autonomous driving information may deliver the information on the lane change to the user by outputting flickering of, among the lines displayed at the opposite edge portions of the display, the line in the direction, in which the lane change is input, when an command for the lane change through the autonomous driving is input by the user.

Through this, the user may perform the lane change or may intuitively recognize the situation which is to be performed, in advance.

Figure 10:
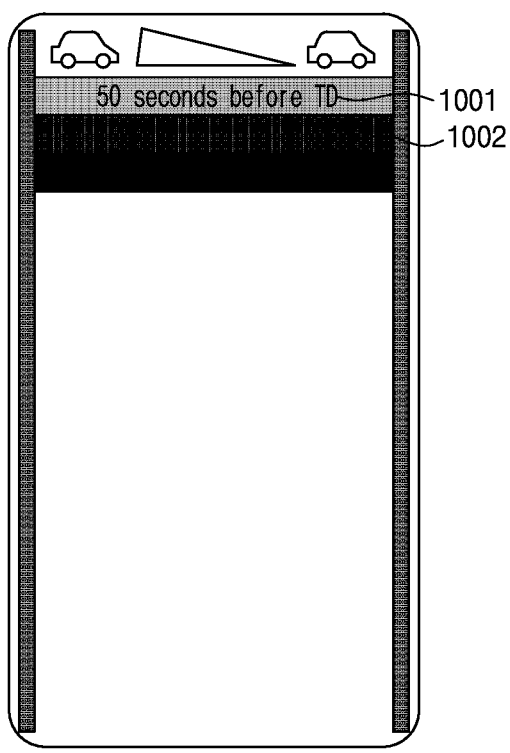
FIG. 10 is a view exemplarily illustrating that a display is covered by stages according to a time until a TD, according to various exemplary embodiments of the present invention.

FIG. 10 is a view exemplarily illustrating that a display is covered by stages according to a time until a TD, according to various exemplary embodiments of the present invention.

Referring to FIG. 10, the apparatus 200 for providing autonomous driving information may cover the screen of the display by stages according to a time left until generation of a TD when it is determined that no response to the generation of the TD is made by the user.

As an example, the apparatus 200 for providing autonomous driving information may cover the screen of the display by stages according to the time left until the generation of the TD, when it is determined that no response to the TD situation is made in a situation in which information 1001 on the time left until the generation of the TD is output as in the situation of FIG. 7.

As an example, the apparatus 200 for providing autonomous driving information may cover the screen of the display by stages according to the time left until the generation of the TD when no response is made to the TD situation by the user and the time left until the generation of the TD is smaller than a reference time.

As an example, the apparatus 200 for providing autonomous driving information may cover the screen of the display from an upper side by stages according to the time left until the generation of the TD.

As an example, the apparatus 200 for providing autonomous driving information may cover the screen of the display by outputting an opaque layer 1002 on the screen of the display from an upper side by stages.

Through this, the user may intuitively recognize that the time left until the generation of the TD becomes smaller as the screen of the display is covered more.

Furthermore, the apparatus 200 for providing autonomous driving information may inform the user that the time left until the generation of the TD becomes smaller, by covering the screen of the display by stages according to the time left until the generation of the TD and outputting the vibration of the device including the display.

Figure 11:
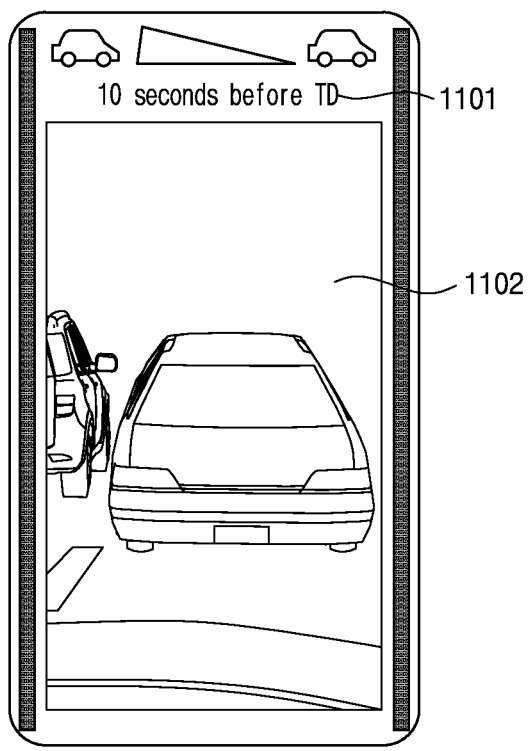
FIG. 11 is a view exemplarily illustrating a display that outputs a front image of a vehicle according to various exemplary embodiments of the present invention.

FIG. 11 is a view exemplarily illustrating a display that outputs a front image of a vehicle according to various exemplary embodiments of the present invention.

Referring to FIG. 11, the apparatus 200 for providing autonomous driving information may output a front image of the vehicle through the display when the controller determines that an intervention is necessary according to a predetermined reference based on the time left until the generation of the TD.

As an example, the apparatus 200 for providing autonomous driving information may output a front image 1102 of the vehicle through the display when it is determined that an intervention is necessary according to the predetermined reference based on the time left until the generation of the TD when information 1101 on the time left until the generation of the TD is output as in the situation of FIG. 7.

As an example, the front image 1102 of the vehicle may be an image acquired through the camera provided in the vehicle.

As an example, the apparatus 200 for providing autonomous driving information may determine that an intervention is necessary when the time left until the generation of the TD becomes smaller than the preset threshold time, and may output the front image 1102 of the vehicle at the center portion of the display.

Through this, the user may recognize a situation on the front side of the vehicle through the front image output on the display, and may cope with the front situation promptly when a control right has to be transferred in a response to the TD situation.

Figure 12:
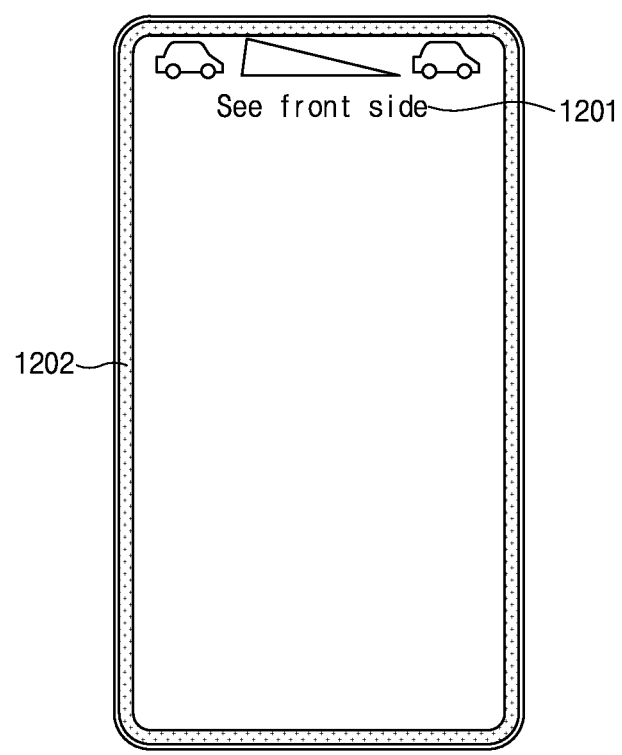
FIG. 12 is a view exemplarily illustrating a display that outputs a warning according to various exemplary embodiments of the present invention.

FIG. 12 is a view exemplarily illustrating a display that outputs a warning according to various exemplary embodiments of the present invention.

Referring to FIG. 12, the apparatus 200 for providing autonomous driving information may output a warning through the display when it is determined that the autonomous driving level of the vehicle is a level, by which the user is not allowed to take his or her eyes off from the front side thereof.

The autonomous driving level of the vehicle, by which the user is not allowed to take his or her eyes off from the front side, may mean an automation level corresponding to level 2 illustrated in FIG. 1.

As an example, the apparatus 200 for providing autonomous driving information may output a warning through a letter 1201 displayed at an upper portion of the display and a line 1202 displayed at an edge portion of the display.

As an example, the apparatus 200 for providing autonomous driving information may output a warning of the contents that the user is not allowed to take his or her eyes off from the front side by outputting a sentence that "See the front side" at an upper portion of the display.

As an example, the apparatus 200 for providing autonomous driving information may inform the user of a warning situation by outputting a red line at an edge portion of the display.

Here, the sentence that "See the front side" or the red line is exemplary, and another sentence or another color may be determined actually.

Through this, the user may recognize a situation, in which he or she has to see the front and may prepare for a dangerous situation.

Figure 13:
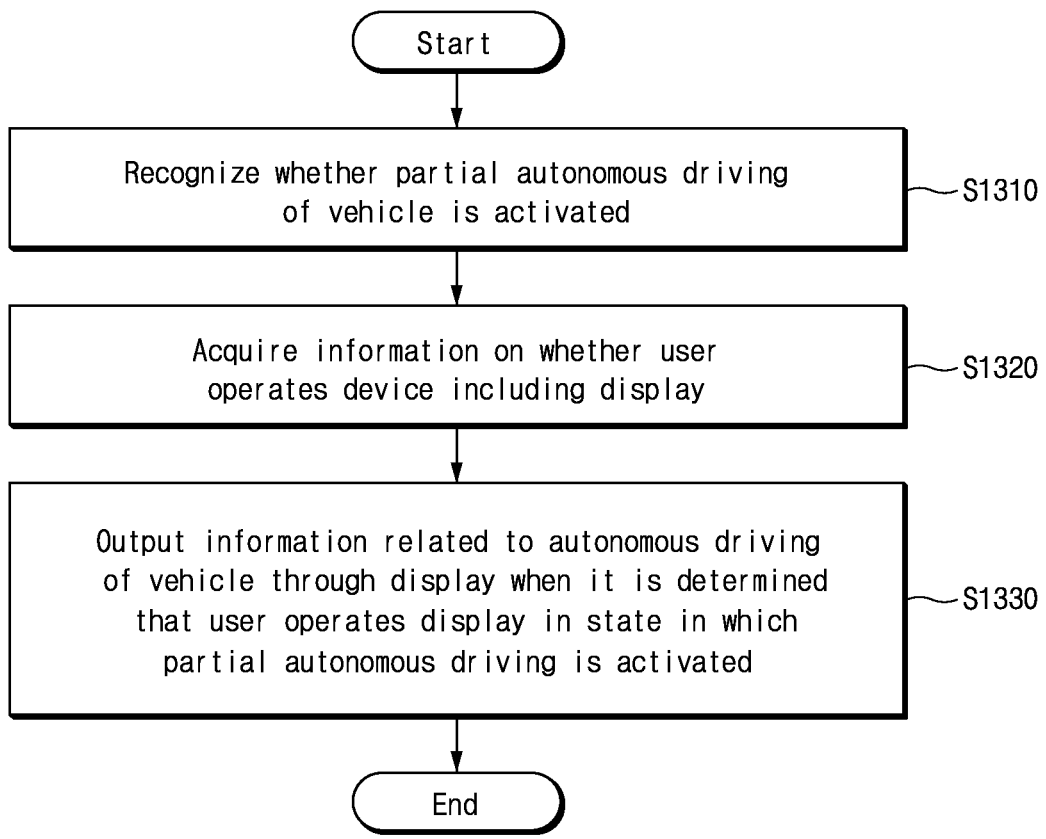
FIG. 13 is a flowchart illustrating a method for providing autonomous driving information according to various exemplary embodiments of the present invention.

FIG. 13 is a flowchart illustrating a method for providing autonomous driving information according to various exemplary embodiments of the present invention.

Referring to FIG. 13, a method for providing autonomous driving information may include operation S1310 of recognizing whether partial autonomous driving of a vehicle is activated, operation S1320 of acquiring information on whether a user operates a device including a display, and operation S1330 of outputting autonomous driving information of the vehicle through the display when the controller determines that the user operates the display in a state, in which the partial autonomous driving is activated.

Operation S1310 of recognizing whether partial autonomous driving of a vehicle is activated may be performed through the autonomous driving recognizer 210.

As an example, operation S1310 of recognizing whether partial autonomous driving of a vehicle is activated may include an operation of acquiring information of the autonomous driving operation of the vehicle from the autonomous driving system while interworking with the autonomous driving system of the vehicle.

Operation S1320 of acquiring information on whether a user operates a device including a display may be performed through the detector 220.

As an example, the device including the display may include at least one of a communication terminal and an AVN system.

As an example, operation S1320 of acquiring information on whether a user operates a device including a display may include an operation of acquiring information on whether the user operates the device including the display, based on the image acquired through at least one of a camera provided in the interior of the vehicle and a camera provided in a communication terminal of the user.

As an example, operation S1320 of acquiring information on whether a user operates a device including a display may include an operation of acquiring information on whether the user operates the communication terminal through information that interworks with the communication terminal of the user.

As an example, operation S1320 of acquiring information on whether a user operates a device including a display may include an operation of acquiring information on whether the user operates the AVN system through information on whether the user executes a function which is not related to driving of the vehicle through the AVN system.

Operation S1330 of outputting autonomous driving information of the vehicle, through the display, may be performed by the controller 230, when it is determined that the user operates the display in a state, in which the partial autonomous driving is activated.

As an example, the autonomous driving information of the vehicle may include information on a distance between vehicles, information on recognition of a line, information on a time left until generation of a TD, and information on whether a lane change is possible.

As an example, operation S1330 of outputting autonomous driving information of the vehicle through the display when the controller determines that the user operates the display in a state, in which the partial autonomous driving is activated may include an operation of outputting autonomous driving information through at least one of a color and flickering of the display and vibration of the device including the display.

Accordingly, the steps of the method or algorithm described in relation to the exemplary embodiments of the present invention may be implemented directly by hardware executed by the processor, a software module, or a combination thereof. The software module may reside in a storage medium (that is, the memory and/or the storage), such as a RAM, a flash memory, a ROM, an EPROM, an EEPROM, a register, a hard disk, a detachable disk, or a CD-ROM.

The exemplary storage medium is coupled to the processor, and the processor may read information from the storage medium and may write information in the storage medium. In another method, the storage medium may be integrated with the processor. The processor and the storage medium may reside in an application specific integrated circuit (ASIC). The ASIC may reside in a user terminal. In another method, the processor and the storage medium may reside in the user terminal as an individual component.

The effects of the apparatus and the method for providing autonomous driving information according to various exemplary embodiments of the present invention will be referred to as follows.

According to at least one of the exemplary embodiments of the present invention, an apparatus and a method for providing information of autonomous driving of a vehicle to a passenger of the vehicle through a display may be provided.

According to at least one of the exemplary embodiments of the present invention, an apparatus and a method for providing autonomous driving information, which may effectively provide driving information to a site, at which a sight of a driver stays in an eye off situation may be provided.

According to at least one of the exemplary embodiments of the present invention, an apparatus and a method for providing autonomous driving information, which decreases a probability of generation of a dangerous situation by providing information for a driver when a sight of the driver is not the front side when an autonomous driving level is a level, by which an eye-off is not allowed, may be provided.

According to at least one of the exemplary embodiments of the present invention, an apparatus and a method for providing autonomous driving information, which decreases a danger of an accident by allowing a driver to acquire a control right promptly when the control right of the driver is necessary may be provided.

According to at least one of the exemplary embodiments of the present invention, an apparatus and a method for providing autonomous driving information, which may cope with generation of an accident by delivering information with a color or flickering or giving a warning such that a driver may intuitively recognize information on autonomous driving through a display may be provided.

Furthermore, the present invention may provide various effects that are directly or indirectly recognized.

The above description is a simple exemplification of the technical spirits of the present invention, and the present invention may be variously corrected and modified by those skilled in the art to which various exemplary embodiments of the present invention pertains without departing from the essential features of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of providing autonomous driving information, the apparatus comprising:
   an autonomous driving recognizer configured to recognize whether partial autonomous driving of a vehicle is activated;
   a detector configured to detect whether a device including a display is operated by a user; and
   a controller configured to output the autonomous driving information of the vehicle through the display when the controller determines that the user operates the display in a state, in which the partial autonomous driving is activated,
   wherein the detector is configured to detect whether the user operates the device including the display according to whether a sight of the user faces the device including the display, and
   wherein the controller is configured to output the autonomous driving information of the vehicle through the display which the sight of the user faces.

2. The apparatus of claim 1, wherein the device including the display includes at least one of a communication terminal and an audio video navigation (AVN) system.

3. The apparatus of claim 1, wherein the detector is configured to detect information on whether the user operates the device including the display, according to an image acquired through at least one of a camera provided in an interior of the vehicle and a camera provided in a communication terminal of the user.

4. The apparatus of claim 1, wherein the detector is configured to detect information on whether the user operates a communication terminal of the user, through information associated with the communication terminal.

5. The apparatus of claim 1, wherein the detector is configured to detect information on whether the user operates an AVN system, based on whether the user executes a function which is not related to driving of the vehicle through the AVN system.

6. The apparatus of claim 1, wherein the autonomous driving information of the vehicle includes information on a distance between vehicles, information on recognition of lines, information on a time left until generation of a transition demand (TD), and information on whether a lane change is possible.

7. The apparatus of claim 1, wherein the controller is configured to output a warning through the display when the controller determines that an autonomous driving level of the vehicle is a level, at which the user is not allowed to take his or her eyes off from a front side of the vehicle.

8. The apparatus of claim 6, wherein the controller is configured to cover a screen of the display by stages according to the time left until the generation of the TD when the controller determines that there is no response of the user to the generation of the TD.

9. The apparatus of claim 6, wherein the controller is configured to output a front image of the vehicle through the display when the controller determines that an intervention is necessary according to a predetermined reference based on the time left until the generation of the TD.

10. The apparatus of claim 1, wherein the controller is configured to output the autonomous driving information through at least one of a color and flickering of the display, and vibration of the device including the display.

11. The apparatus of claim 1, wherein the controller is configured to output a rear image in a direction, in which a lane is changed, through the display when a command for a lane change through the autonomous driving is input to the device by the user.

12. The apparatus of claim 1, wherein the controller is configured to output information on at least one of whether opposite lines of the vehicle are recognized and whether a lane of the vehicle is changeable to opposite sides of the vehicle, through at least one of a color and flickering displayed at a portion or an entire portion of an edge portion of the display.

13. A method of providing autonomous driving information, the method comprising:
   recognizing, by an autonomous driving recognizer, whether partial autonomous driving of a vehicle is activated;
   acquiring, by a detector, information on whether a user operates a device including a display; and
   outputting, by a controller, the autonomous driving information of the vehicle through the display when the controller determines that the user operates the display in a state, in which the partial autonomous driving is activated,
   wherein the acquiring, by a detector, information on whether a user operates a device including a display includes:
      detecting, by the detector, information on whether the user operates the device including the display according to whether a sight of the user faces the device including the display, and
   wherein the outputting, by a controller, the autonomous driving information of the vehicle through the display when the controller determines that the user operates the display in a state includes:
      outputting, by the controller, the autonomous driving information of the vehicle through the display which the sight of the user faces.

14. The method of claim 13, wherein the device including the display includes at least one of a communication terminal and an AVN system.

15. The method of claim 13, wherein the autonomous driving information of the vehicle includes information on a distance between vehicles, information on recognition of a line, information on a time left until generation of a TD, and information on whether a lane change is possible.

16. The method of claim 13, wherein the outputting, by the controller, of autonomous driving information of the vehicle through the display when the controller determines that the user operates the display in a state, in which the partial autonomous driving is activated includes:
   outputting, by the controller, a warning through the display when the controller determines that an autonomous driving level of the vehicle is a level, at which the user is not allowed to take his or her eyes off from a front side of the vehicle.

17. The method of claim 15, wherein the outputting, by the controller, of the autonomous driving information of the vehicle through the display when the controller determines that the user operates the display in a state, in which the partial autonomous driving is activated includes:
   covering, by the controller, a screen of the display by stages according to the time left until the generation of the TD when the controller determines that there is no response of the user to the generation of the TD.

18. The method of claim 15, wherein the outputting, by the controller, of the autonomous driving information of the vehicle through the display when the controller determines that the user operates the display in a state, in which the partial autonomous driving is activated includes:
  outputting, by the controller, a front image of the vehicle through the display when the controller determines that an intervention is necessary according to a predetermined reference based on the time left until the generation of the TD.

19. The method of claim 13, wherein the outputting, by the controller, of autonomous driving information of the vehicle through the display when the controller determines that the user operates the display in a state, in which the partial autonomous driving is activated includes:
  outputting, by the controller, a rear image in a direction, in which a lane is changed, through the display when a command for a lane change through the autonomous driving is input to the device by the user.

20. The method of claim 13, wherein the outputting, by the controller, of the autonomous driving information of the vehicle through the display when the controller determines that the user operates the display in a state, in which the partial autonomous driving is activated includes:
  outputting, by the controller, information on at least one of whether opposite lines of the vehicle are recognized and whether a lane of the vehicle is changeable to opposite sides of the vehicle, through at least one of a color and flickering displayed at a portion or an entire portion of an edge portion of the display.

* * * * *